(12) United States Patent
Tsai et al.

(10) Patent No.: US 11,372,080 B2
(45) Date of Patent: Jun. 28, 2022

(54) CONTINUOUS WAVE RADAR SYSTEM

(71) Applicant: National Chung-Shan Institute of Science and Technology, Taoyuan (TW)

(72) Inventors: Shih-Che Tsai, Tao-yuan (TW); Jer-Long Chen, Tao-yuan (TW); Min-Ching Lin, Tao-yuan (TW); Ruei-Shen Wang, Tao-yuan (TW); You-Heng Wei, Tao-yuan (TW)

(73) Assignee: National Chung-Shan Institute of Science and Technology, Taoyuan (TW)

( * ) Notice: Subject to any disclaimer, the term of this patent is extended or adjusted under 35 U.S.C. 154(b) by 371 days.

(21) Appl. No.: 16/695,118

(22) Filed: Nov. 25, 2019

(65) Prior Publication Data
US 2021/0156956 A1  May 27, 2021

(51) Int. Cl.
*G01S 7/03* (2006.01)
*G01S 7/35* (2006.01)

(52) U.S. Cl.
CPC .............. *G01S 7/038* (2013.01); *G01S 7/35* (2013.01)

(58) Field of Classification Search
None
See application file for complete search history.

(56) References Cited

U.S. PATENT DOCUMENTS

| 5,574,464 A | * | 11/1996 | Madonna | ............... G01S 7/034 342/198 |
| 2002/0101388 A1 | | 8/2002 | Ippolito | |
| 2007/0046558 A1 | | 3/2007 | Tillery | |
| 2018/0203110 A1 | * | 7/2018 | Watanabe | ............... G01S 7/027 |
| 2020/0412012 A1 | * | 12/2020 | Zhao | ....................... H01Q 1/28 |

FOREIGN PATENT DOCUMENTS

| CN | 101872894 A | 10/2010 |
| CN | 206506025 U | 9/2017 |
| WO | 2019050284 A1 | 3/2019 |

* cited by examiner

*Primary Examiner* — Whitney Moore

(57) ABSTRACT

A continuous wave radar system comprises a substrate, a transmitter disposed on the substrate, a receiver disposed on the substrate, and an isolating device comprising a plurality of metal plates parallelly disposed on the substrate between the transmitter and the receiver for isolating leakage signal transmitted from the transmitter to the receiver. The metal plates are grounded with the transmitter and the receiver via electrical connection between the metal plates and the substrate. The metal plates are so arranged that an eddy current induced in each of the metal plates is directed away by grounding when the leakage signal passes through the metal plates.

19 Claims, 17 Drawing Sheets

CONTINUOUS WAVE RADAR SYSTEM

FIELD OF THE INVENTION

The present disclosure relates to a continuous wave radar system, and more particularly, to a continuous wave radar system having an isolating device for attenuating leakage signals.

BACKGROUND

Signal leakage between a transmitter and a receiver has been a challenge for designing a continuous wave radar system. Traditionally, adopting physical separation, such as lengthened distance or shielding, between the receiver and the transmitter has been a common solution to reduce the signal leakage. However, lengthening distance can significantly increase the overall size, and shielding can significantly increase the overall weight of the continuous wave radar system.

Another common solution to signal leakage has been to include a signal cancellation circuit in the continuous wave radar system. The signal cancellation circuit is coupled to the receiver for providing cancellation signals that cancel leakage signals from the transmitter. In order to include the signal cancellation circuit, overall circuitry of the continuous wave radar system becomes more complicated, therefore increasing design and manufacturing costs of the continuous wave radar system.

In view of the above, there is a need of a continuous wave radar system that can effectively reduce signal leakage between the transmitter and the receiver.

SUMMARY OF THE INVENTION

One aspect of the present disclosure is to provide a continuous wave radar system having an isolating device that reduces signal leakage between the transmitter and the receiver without increasing circuitry complexity.

Another aspect of the present disclosure is to provide a continuous wave radar system having an isolating device that reduces signal leakage between the transmitter and the receiver without significantly increasing the overall size of the system.

In some embodiments, the present disclosure provides a continuous wave radar system comprises a substrate, a transmitter disposed on the substrate, a receiver disposed on the substrate, and an isolating device comprising a plurality of metal plates parallelly disposed on the substrate between the transmitter and the receiver for attenuating leakage signal transmitted from the transmitter to the receiver. The metal plates are grounded with the transmitter and the receiver via electrical connection between the metal plates and the substrate. The metal plates are so arranged that an eddy current induced in each of the metal plates is directed away by grounding when the leakage signal passes through the metal plates.

In some embodiments, the metal plates are evenly spaced on the substrate.

In some embodiments, the metal plates are perpendicular to the substrate.

In some embodiments, a distance between each adjacent pair of the metal plates is 0.25-0.45 fold of a wavelength of a wave transmitted by the transmitter.

In some embodiments, a distance between the transmitter and the receiver is 3-5 folds of a wavelength of a wave transmitted by the transmitter.

In some embodiments, the isolating device is placed equally apart from the transmitter and the receiver.

In some embodiments, heights of the metal plates vary along a direction from the transmitter toward the receiver.

In some embodiments, top edges of the metal plates form a mountain-shape.

In some embodiments, the mountain-shape is symmetrical.

In some embodiments, the mountain-shape is asymmetrical.

In some embodiments, a slope of the mountain-shape is formed by a height difference between each adjacent pair of the metal plates falling within a range of 0.1-0.5 fold of a wavelength of a wave transmitted by the transmitter.

In some embodiments, the heights of the metal plates fall within a range of 3-6 folds of a wavelength of a wave transmitted by the transmitter.

In some embodiments, the metal plates are taller than the transmitter and the receiver.

In some embodiments, edges of the metal plates are round.

In some embodiments, a thickness of the metal plates falls within a range of 1-5 mm.

In some embodiments, the metal plates are made of aluminum.

In some embodiments, the isolating device further comprises a wave absorbing material disposed within a plurality of spaces between the metal plates.

In some embodiments, the isolating device further comprises a wave absorbing material coated on the metal plates.

In some embodiments, at least one of the transmitter and the receiver is a directional antenna.

In some embodiments, the metal plates are fixed to the substrate by screws.

In sum, the continuous wave radar system according to the various embodiments of the present disclosure utilize the isolating device having a plurality of parallelly arranged metal plates to effectively attenuate the leakage signal for a continuous wave radar system.

BRIEF DESCRIPTION OF THE DRAWINGS

The accompanying drawings illustrate one or more embodiments of the present invention and, together with the written description, explain the principles of the present invention. Wherever possible, the same reference numbers are used throughout the drawings referring to the same or like elements of an embodiment.

In accordance with common practice, the various described features are not drawn to scale and are drawn to emphasize features relevant to the present disclosure. Like reference characters denote like elements throughout the figures and text.

DETAILED DESCRIPTION OF THE PREFERRED EMBODIMENTS

Figure 1:
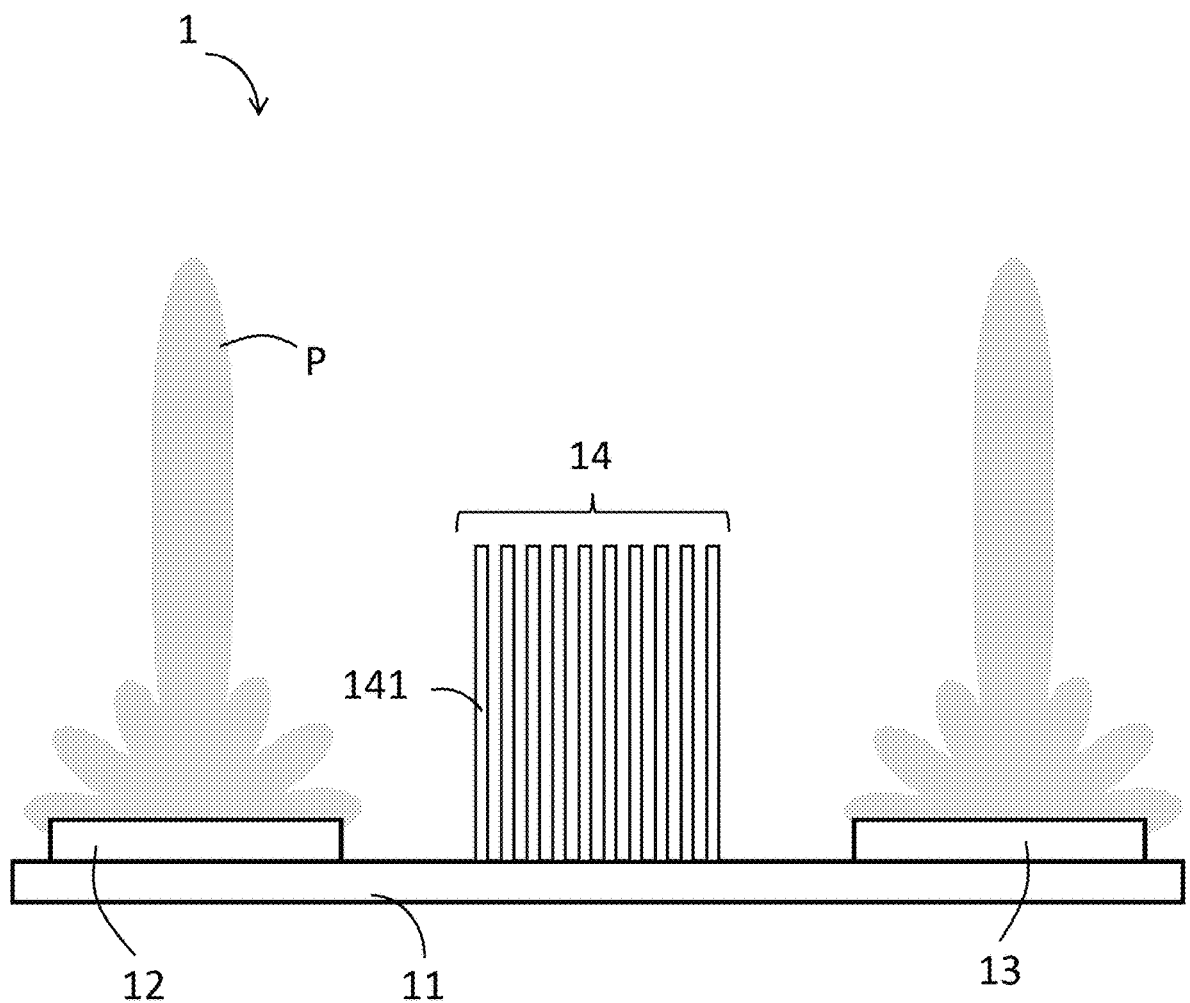
FIG. 1 is a schematic illustration of a continuous wave radar system having an isolating device in accordance with one embodiment of the present disclosure.

The present invention will now be described more fully hereinafter with reference to the accompanying drawings illustrating various exemplary embodiments of the invention. The present invention may, however, be embodied in many different forms and should not be construed as limited to the embodiments set forth herein. Rather, these embodiments are provided so that this disclosure will be thorough and complete, and will fully convey the scope of the disclosure to those skilled in the art. Like reference numerals refer to like elements throughout.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," or "includes" and/or "including" or "has" and/or "having" when used herein, specify the presence of stated features, regions, integers, steps, operations, elements, and/or components, but do not preclude the presence or addition of one or more other features, regions, integers, steps, operations, elements, components, and/or groups thereof.

It will be understood that the terms "and/or" and "at least one" include any and all combinations of one or more of the associated listed items. It will also be understood that, although the terms first, second, third etc. may be used herein to describe various elements, components, regions, parts and/or sections, these elements, components, regions, parts and/or sections should not be limited by these terms. These terms are only used to distinguish one element, component, region, part or section from another element, component, region, layer or section. Thus, a first element, component, region, part or section discussed below could be termed a second element, component, region, layer or section without departing from the teachings of the present disclosure.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Referring to FIG. 1, in one embodiment of the present disclosure, a continuous wave radar system 1 includes a substrate 11, a transmitter 12 disposed over the substrate 11, a receiver 13 disposed over the substrate 11, and an isolating device 14 disposed over the substrate and arranged between the transmitter 12 and the receiver 13. The isolating device 14 includes a plurality of metal plates 141 and is configured to attenuate leakage signal transmitted from the transmitter 12 to the receiver 13 by the metal plates 141. The metal plates 141 are arranged parallelly to and spaced apart from each other. The metal plates 141 are grounded via electrical connection between the metal plates 141 and the substrate 11; the transmitter 12 and the receiver 13 are grounded as well. In other words, the transmitter 12, the receiver 13, and the isolating device 14 are electrically connected to a common ground via the substrate. When leakage signals pass through the metal plates 141 of the isolating device 14 from the transmitter 12 to the receiver 13, an eddy current is induced in each of the metal plates 141 and directed away by grounding, therefore attenuating the leakage signals received by the receiver 13.

In one embodiment of the present disclosure, the transmitter 12 and/or the receiver 13 include a directional antenna having an antenna pattern P. The directional antennas may transmit or receive electromagnetic waves in a predefined direction, which may be substantially perpendicular to the substrate 11.

Figure 2:
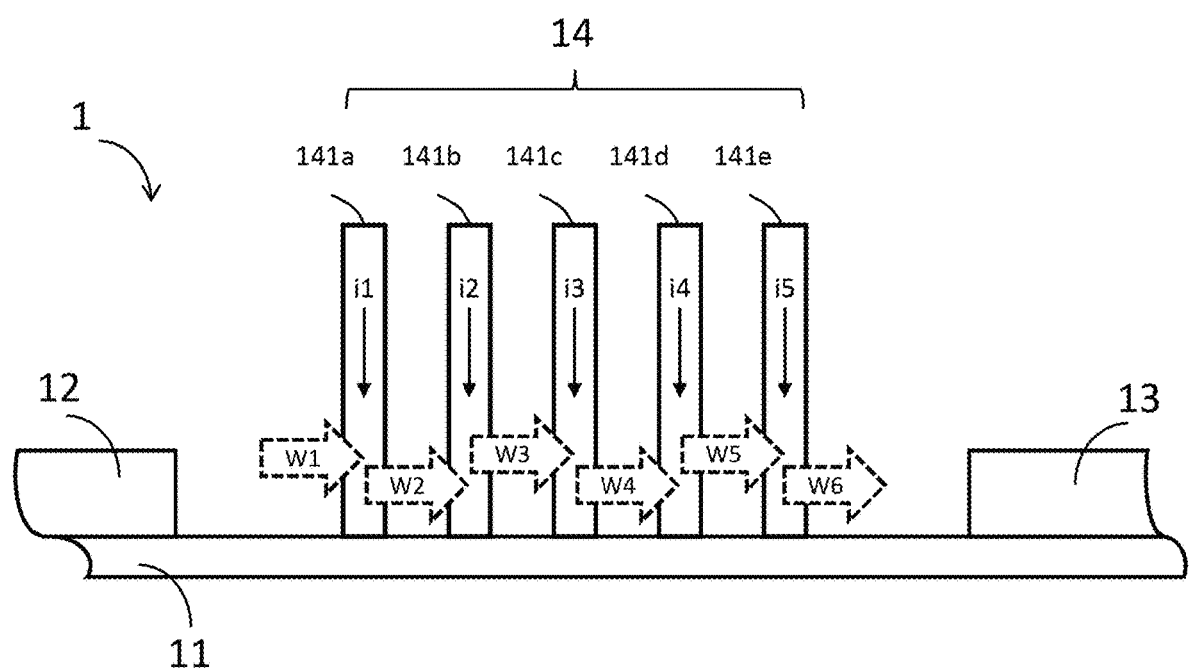
FIG. 2 is a schematic illustration of leakage signal attenuation of the isolating device in the continuous wave radar system in accordance with one embodiment of the present disclosure.

FIG. 2 illustrates the attenuation of an exemplary leakage signal from the transmitter 12 to the receiver 13 by the isolating device 14 of the continuous wave radar system 1.

In one embodiment of the present disclosure, the continuous wave radar system 1 includes the substrate 11, the transmitter 12 disposed on the substrate 11, the receiver 13 disposed on the substrate 11, and the isolating device 14 disposed on the substrate and between the transmitter 12 and the receiver 13. The isolating device 14 includes metal plates 141a, 141b, 141c, 141d and 141e. When the leakage signal W1 is transmitted from the transmitter 12 to the receiver 13, the leakage signal W1 passes through the metal plate 141a and induces an eddy current i1 in the metal plate 141a. Since the metal plate 141a is grounded, the eddy current i1 is directed away from the metal plate 141a toward the ground. Consequently, the leakage signal W1 is attenuated to the leakage signal W2 after passing through the metal plate 141a. Subsequently, the leakage signal W2 is attenuated to leakage signals W3, W4, W5, W6 after passing through the metal plate 141b, 141c, 141d, 141e, respectively. In other words, the leakage signals W1, W2, W3, W4, W5 are sequentially attenuated to leakage signal W6 as eddy currents i2, i3, i4, i5 are respectively induced in the metal plates 141b, 141c, 141d, 141e and directed away by grounding. Therefore, the magnitude of the eddy current reduces from i1 to i5.

Figure 3:
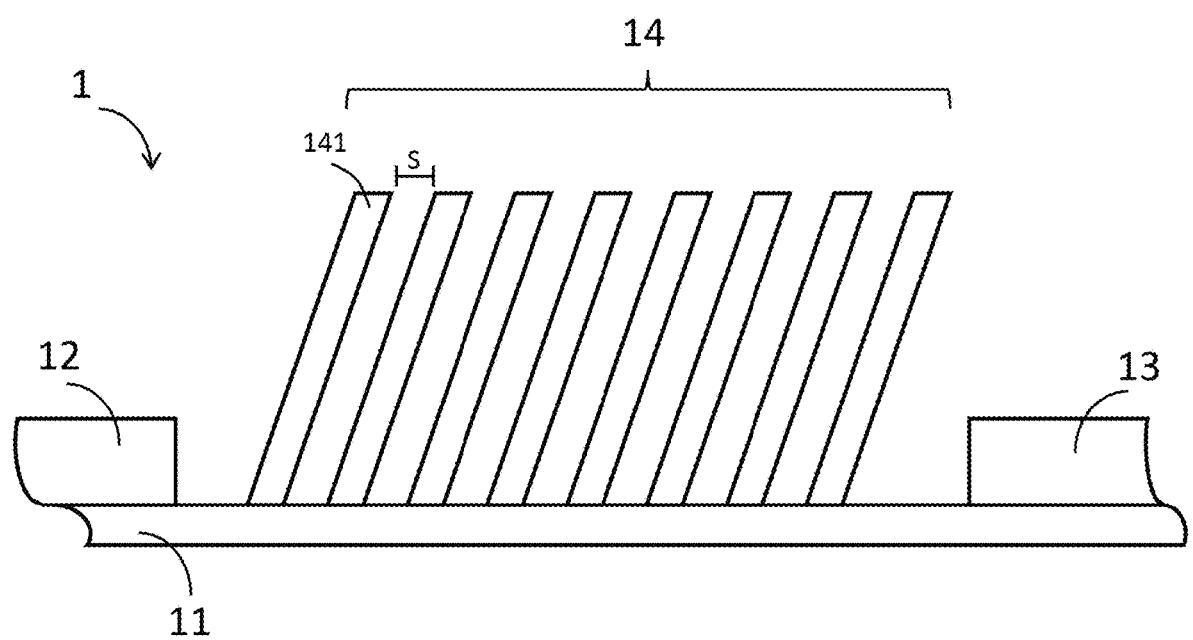
FIG. 3 is a schematic illustration of an arrangement of the metal plates of the isolating device of the continuous wave radar system in accordance with one embodiment of the present disclosure.
Figure 4:
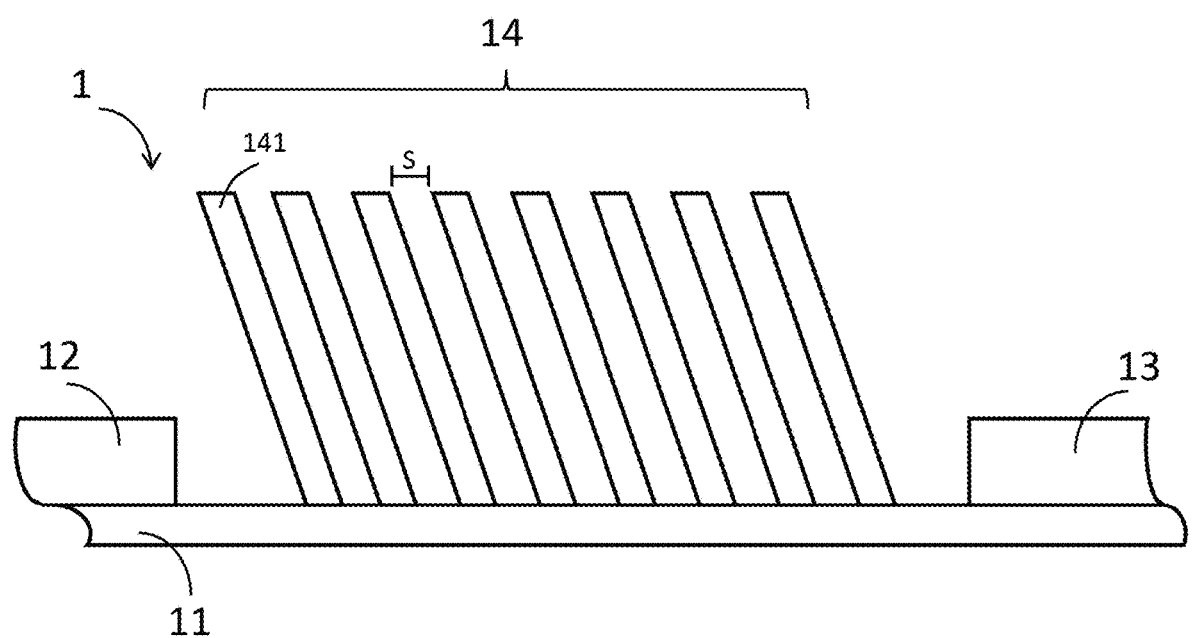
FIG. 4 is a schematic illustration of another arrangement of the metal plates of the isolating device of the continuous wave radar system in accordance with one embodiment of the present disclosure.
Figure 5:
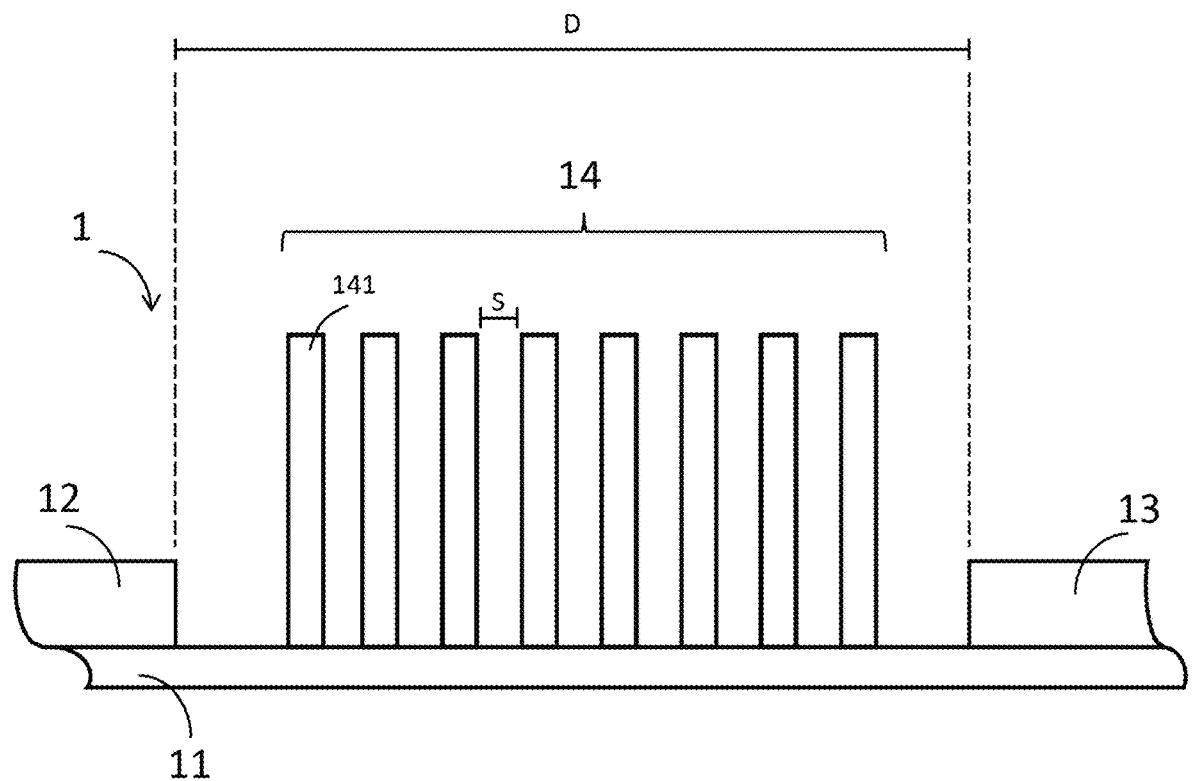
FIG. 5 is a schematic illustration of a spacing between the metal plates and a distance between the transmitter and the receiver of the continuous wave radar system in accordance with one embodiment of the present disclosure.

Referring to FIG. 3 and FIG. 4, in one embodiment of the present disclosure, the metal plates 141 of the isolating device 14 are parallelly arranged and evenly spaced on the substrate 11. In other words, the spaces S between each adjacent pair of the metal plates 141 are consistent. The evenly distributed spaces S reduce possibility of coupling between eddy currents induced in each adjacent pair of metal plates 141 when the leakage signals pass through. The metal plates 141 of the isolating device 14 may be arranged in various configurations; for example, the metal plates 141 may be arranged to lean towards the receiver 13, as illustrated in FIG. 3, or lean towards the transmitter 12, as illustrated in FIG. 4. In some embodiments, as illustrated in FIG. 5, the metal plates 141 may be substantially perpendicular to the substrate 11, as such arrangement results in minimal interference to the electromagnetic field from the transmitter 12 and to the receiver 13. In some embodiments, the isolating device 14 is placed equally apart from the transmitter 12 and the receiver 13. In one embodiment of the present disclosure, when the isolating device 14 includes ten metal plates 141, the space S between the metal plates 141 may be 0.25-0.45 fold of a wavelength of a wave transmitted by the transmitter 12, and a distance D between the transmitter 12 and the receiver 13 may be 3-5 folds of the wavelength of the wave transmitted by the transmitter 12. However, the dimension of the space S and the distance D can be scaled according to the operating frequency of the transmitter 12.

Figure 6:
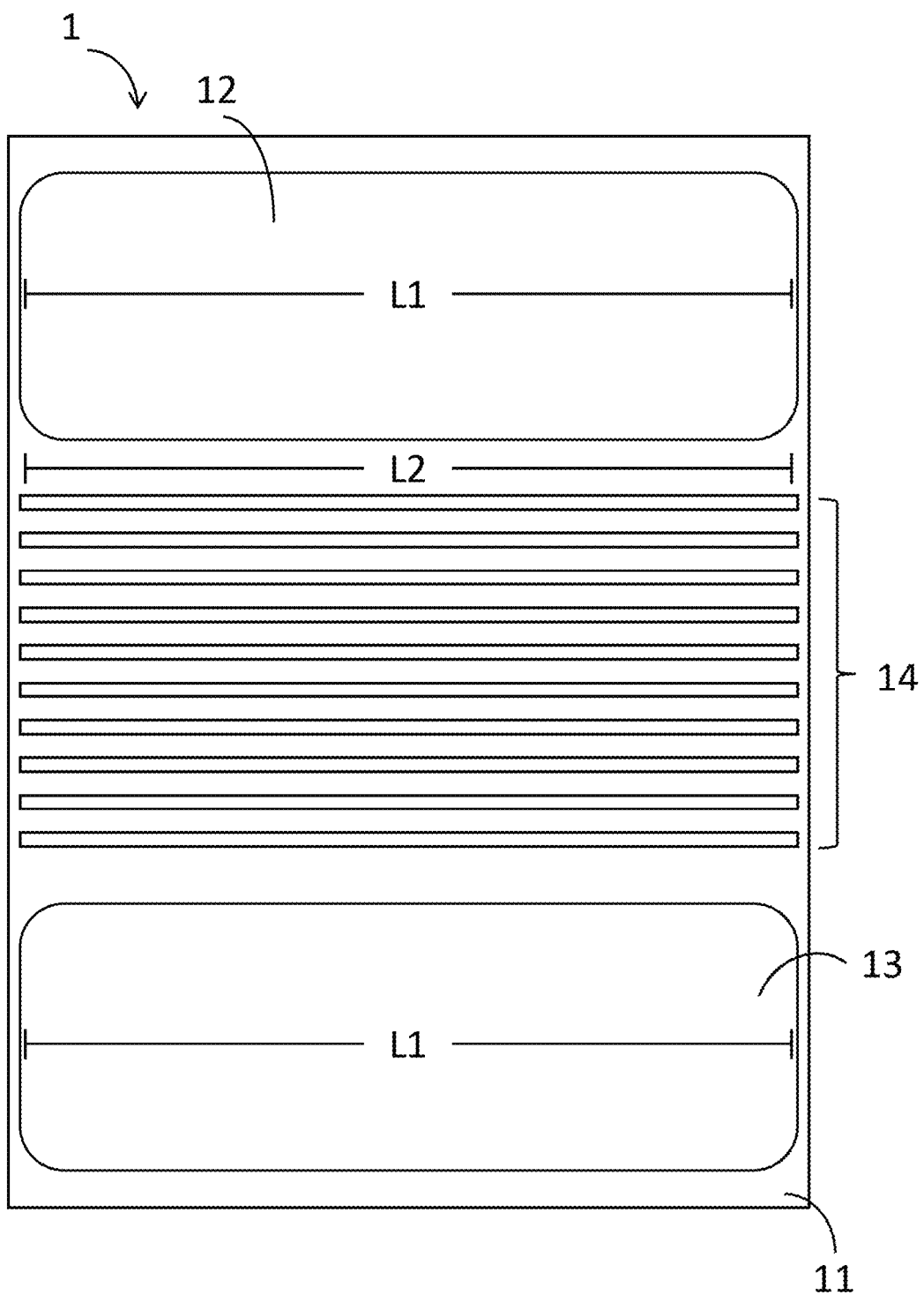
FIG. 6 is a schematic illustration of a top view of the continuous wave radar system in accordance with one embodiment of the present disclosure.

Referring to FIG. 6, in one embodiment of the present disclosure, the transmitter 12 and the receiver 13 of the continuous wave radar system 1 has a length of L1, and the metal plates 14 of the continuous wave radar system 1 has a length of L2. The length L1 is substantially equal to the length L2, such that the metal plates 14 can attenuating the leakage signals from the transmitter 12 towards the receiver 13.

Figure 7:
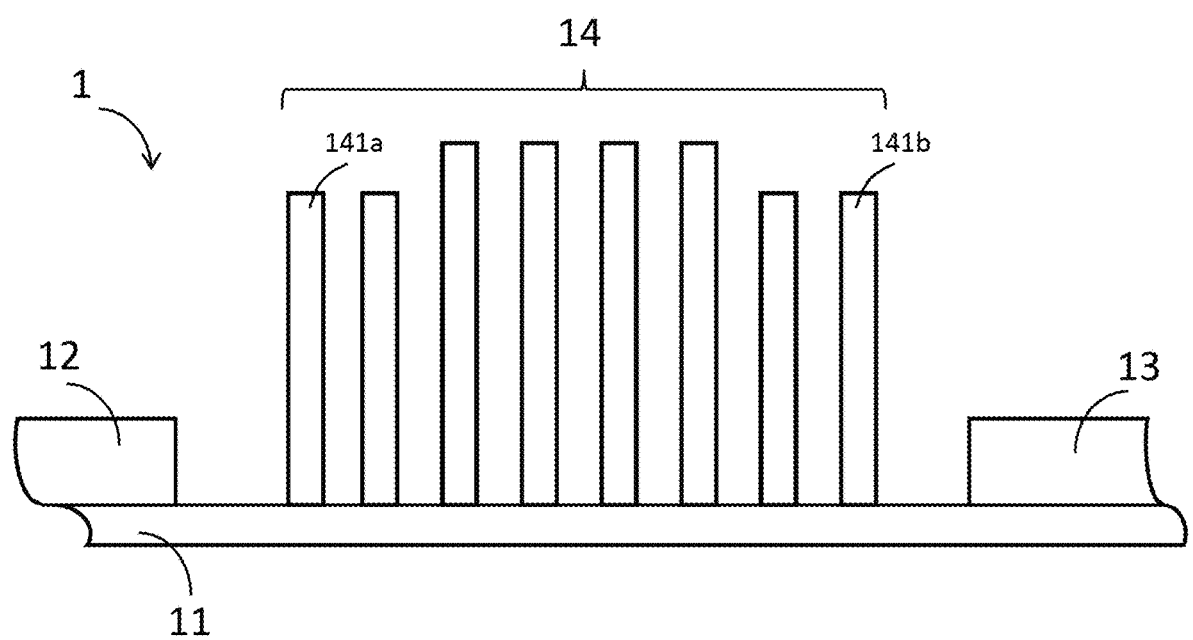
FIG. 7 is a schematic illustration of a configuration of the metal plates of the isolating device of the continuous wave radar system in accordance with one embodiment of the present disclosure.
Figure 8:
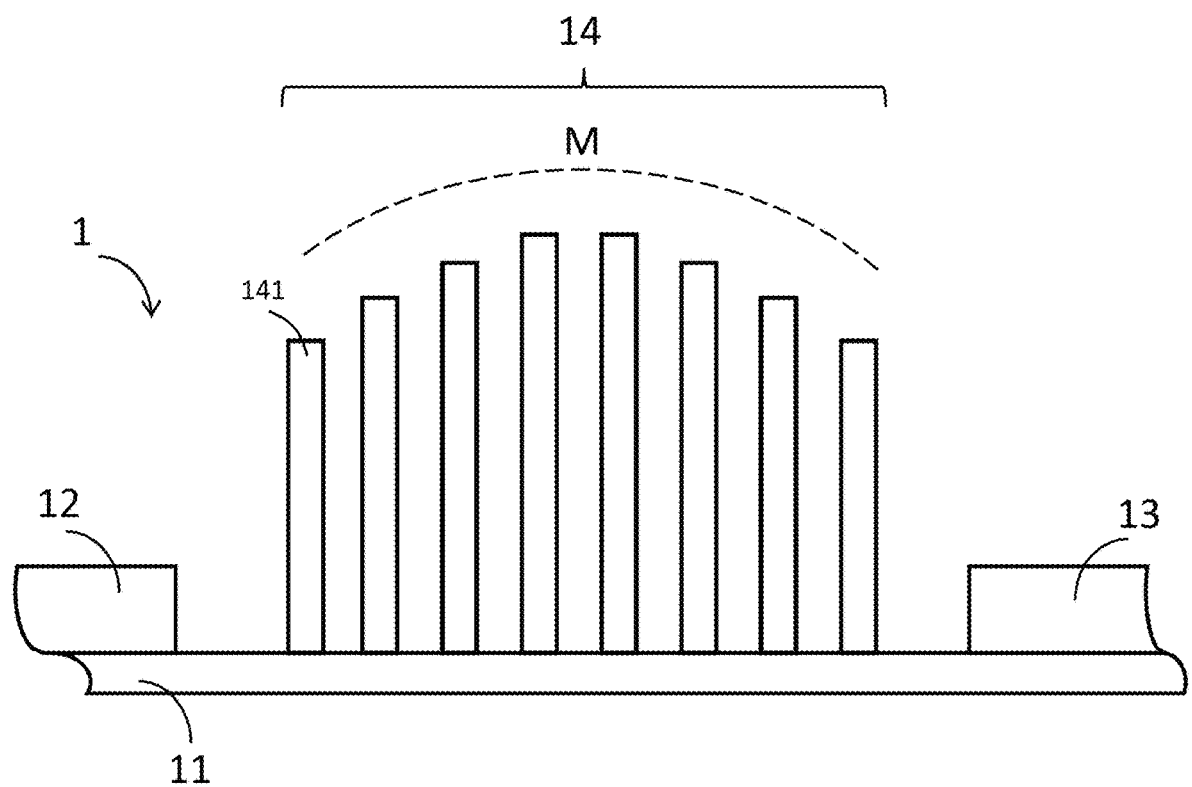
FIG. 8 is a schematic illustration of another configuration of the metal plates of the isolating device of the continuous wave radar system in accordance with one embodiment of the present disclosure.
Figure 9:
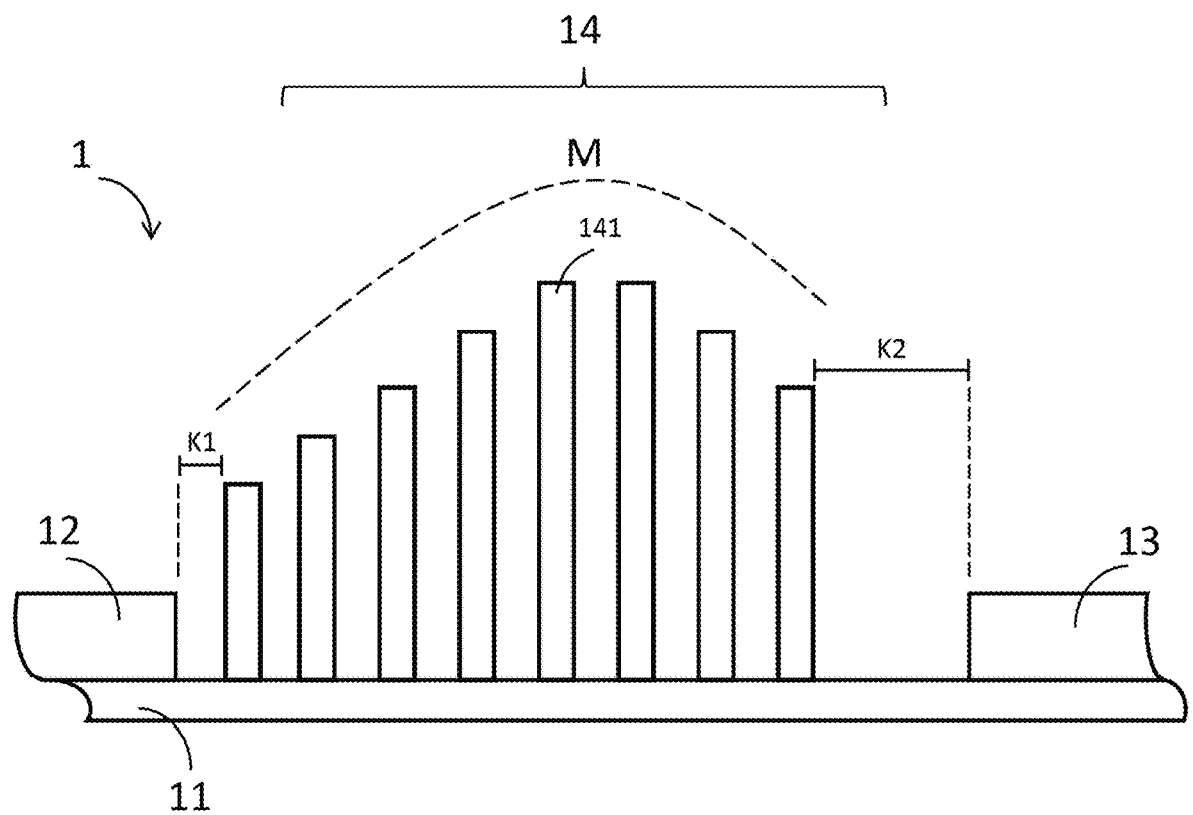
FIG. 9 is a schematic illustration of yet another configuration of the metal plates of the isolating device of the continuous wave radar system in accordance with one embodiment of the present disclosure.

Referring to FIG. 7 through FIG. 9, in one embodiment of the present disclosure, the heights of the metal plates 141 may be inconsistent or vary along a direction from the transmitter 12 to the receiver 13. More specifically, for maintaining the electromagnetic field around the transmitter 12 and the receiver 13, the metal plate 141a closest to the transmitter 12 and the metal plate 141b closest to the receiver 13 may be the shortest among the metal plates 141 in the isolating device 14. For example, as illustrated in FIG. 8, the top edges of the metal plates 141 may form a symmetrical mountain-shape M. The mountain-shape M can be a profile having a single peak between two slopes. In another embodiment of the present disclosure as illustrated in FIG. 9, the isolating device 14 may be arranged closer to the transmitter 12 for fulfilling certain application specific requirements. Therefore, a distance K1 between the isolating device 14 and the transmitter 12 may be shorter than a distance K2 between the isolating device and the receiver 12; such configuration may cause an interference to the electromagnetic field of the transmitter 12. To compensate the interference caused by the unequal distances K1, K2 and to attenuate the leakage signals at the same time, the top edges of the metal plates 141 may be configured to form an asymmetrical mountain-shape M.

Figure 10:
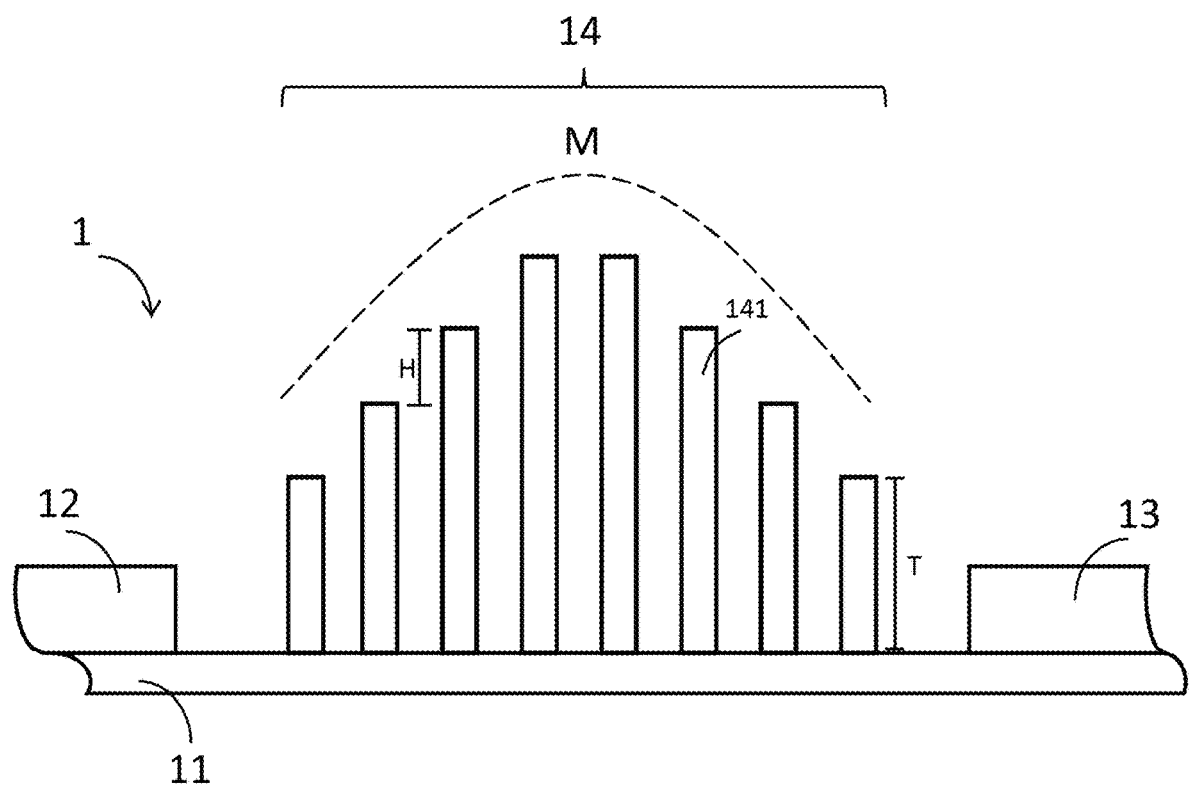
FIG. 10 is a schematic illustration of the other configuration of the metal plates of the isolating device of the continuous wave radar system in accordance with one embodiment of the present disclosure.

Referring to FIG. 10, in one embodiment of the present disclosure, a slope of the mountain-shape M may be formed by a height difference H between each adjacent pair of the metal plates 141, and the height difference H is preferably 0.1-0.5 fold of a wavelength of a wave transmitted by the transmitter 12. In another embodiment of the present disclosure, the heights T of the metal plates may fall within a range of 3-6 folds of a wavelength of a wave transmitted by the transmitter 12. For proper functioning of the isolating device 14, the metal plates 141 are preferably taller than the transmitter 12 and the receiver 13. However, the dimension of the height difference H and the heights can be scaled corresponding to the distance D mentioned in FIG. 5.

Figure 11:
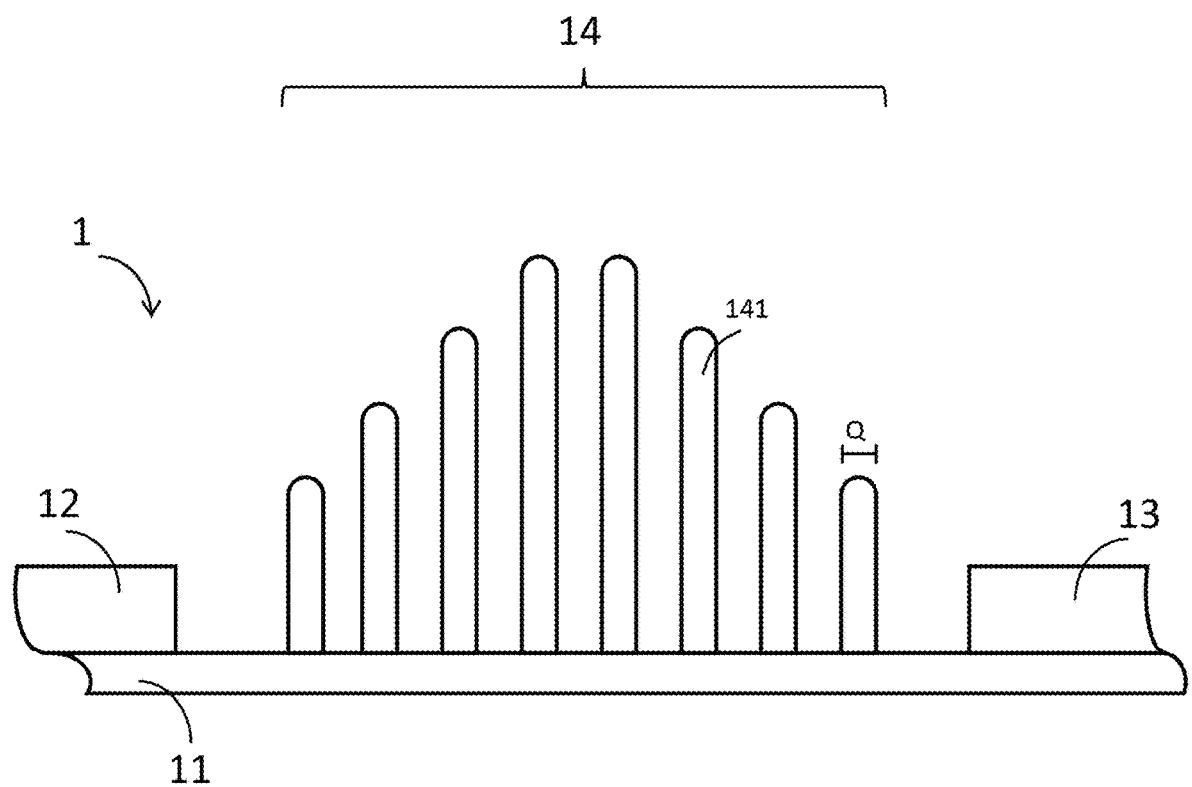
FIG. 11 is a schematic illustration of still another configuration of the metal plates of the isolating device of the continuous wave radar system in accordance with one embodiment of the present disclosure.

Referring to FIG. 11, in one embodiment of the present disclosure, the top edge of the metal plates 141 of the isolating device 14 of the continuous wave radar system 1 may be round. The rounded top edges of the metal plates 141 prevent undesired radiation caused by the induced eddy current in the metal plates 141, because sharp edges tend to act as small antennas when eddy currents are induced. In one embodiment of the present disclosure, a thickness Q of the metal plates 141 may fall within a range of 1-5 mm and is preferably consistent throughout all of the metal plates 141 to minimize the undesired radiation. To ensure structural stability, the metal plates 141 may be made of aluminum to prevent self-bending of the metal plates 141 due to their own weight.

Figure 12:
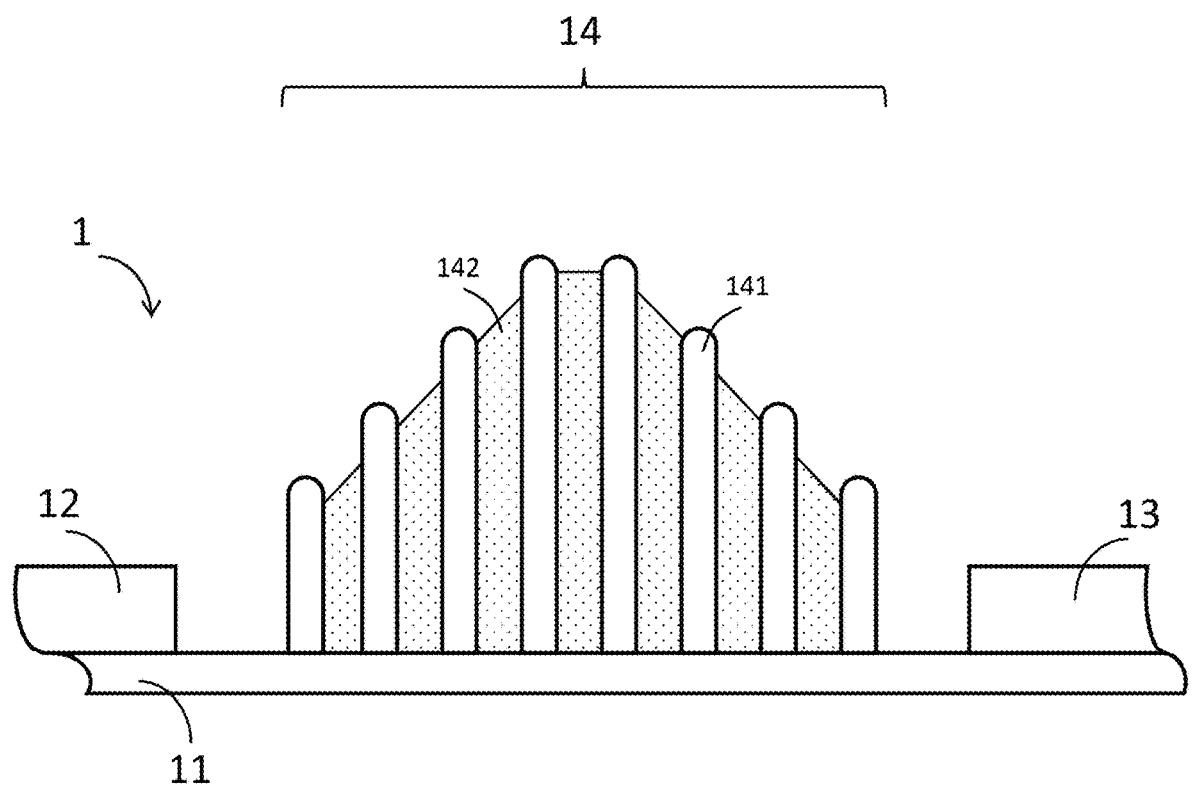
FIG. 12 is a schematic illustration of a configuration of a wave absorbing material for the isolating device of the continuous wave radar system in accordance with one embodiment of the present disclosure.
Figure 13:
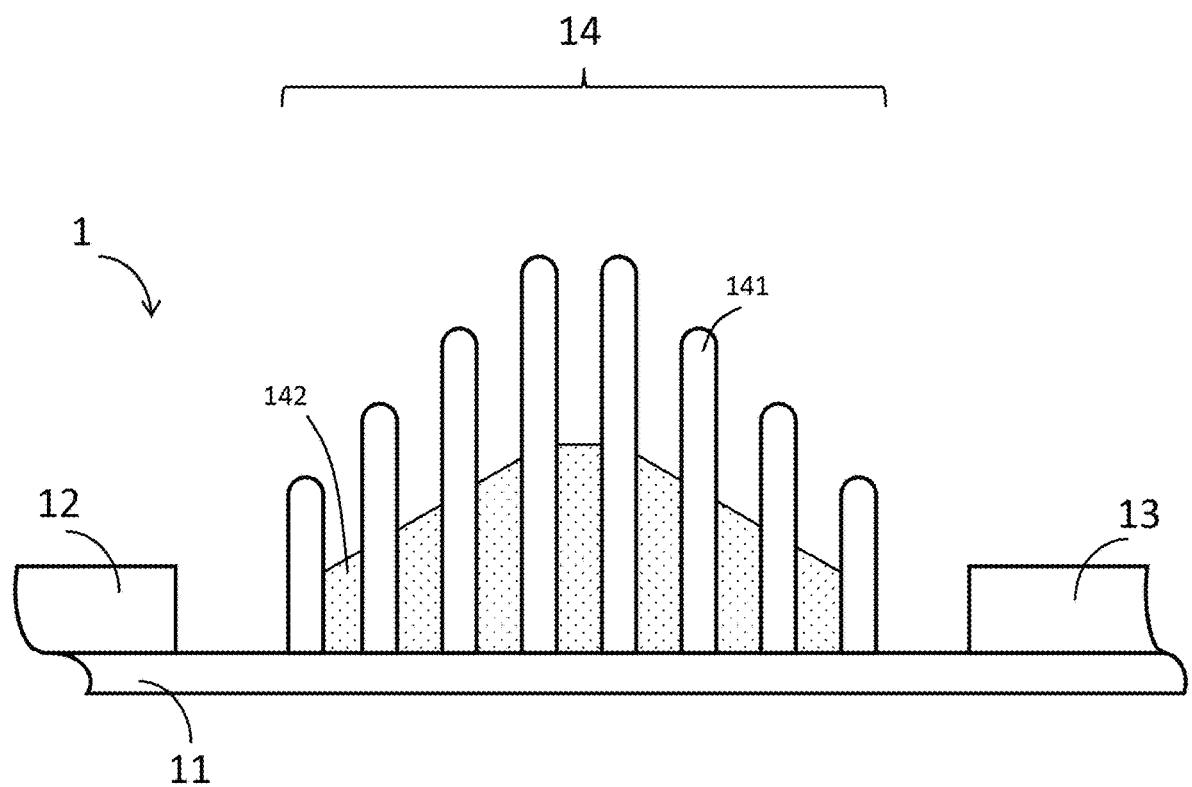
FIG. 13 is a schematic illustration of another configuration of the wave absorbing material for the isolating device of the continuous wave radar system in accordance with one embodiment of the present disclosure.
Figure 14:
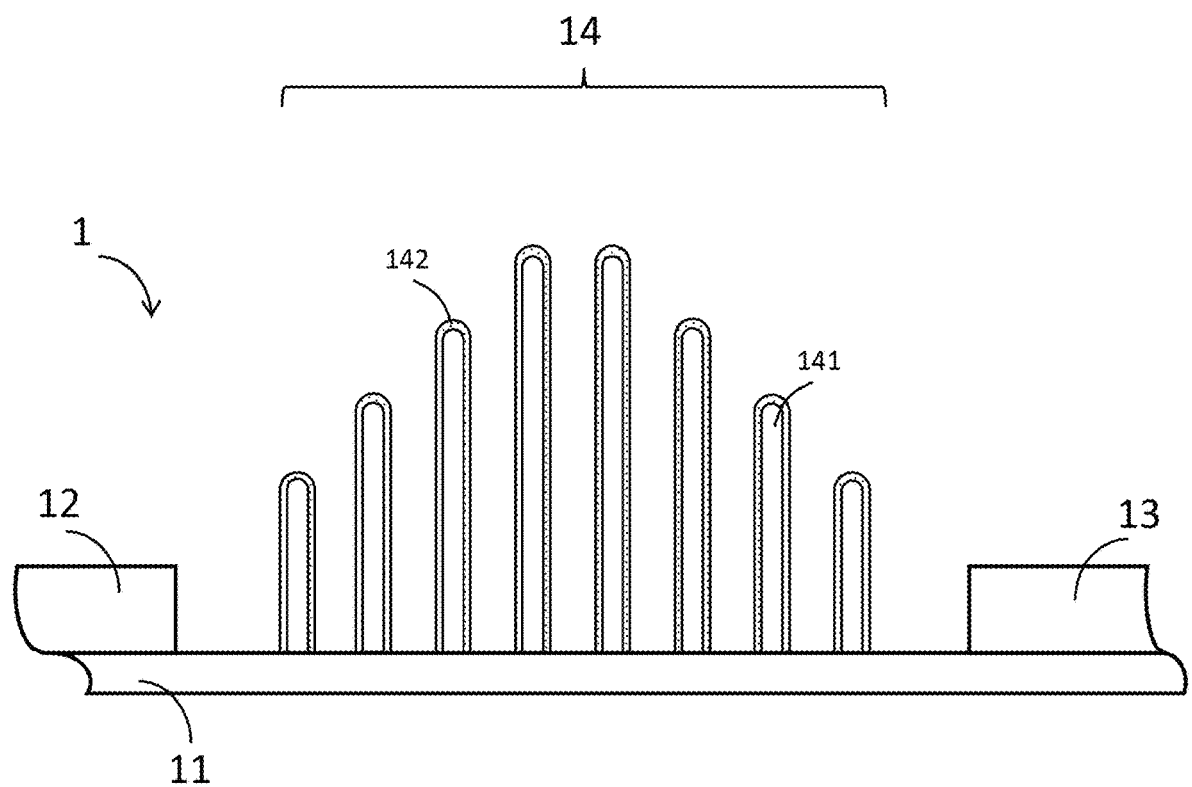
FIG. 14 is a schematic illustration of yet another configuration of the wave absorbing material for the isolating device of the continuous wave radar system in accordance with one embodiment of the present disclosure.

Referring to FIG. 12 and FIG. 13, in one embodiment of the present disclosure, the isolating device 14 may further include a wave absorbing material 142 disposed within the spaces between the metal plates 141. The wave absorbing material 142 may fully or partially fill the spaces between the metal plates 141, as exemplified in FIG. 12 and FIG. 13, respectively. In another embodiment of the present disclosure as illustrated in FIG. 14, the wave absorbing material 142 may be coated on the metal plates 141 of the isolating device 14. The wave absorbing material 142 may be, but is not limited to, graphene, graphite, ferrite, silicon carbide, barium titanate, etc.

Figure 15:
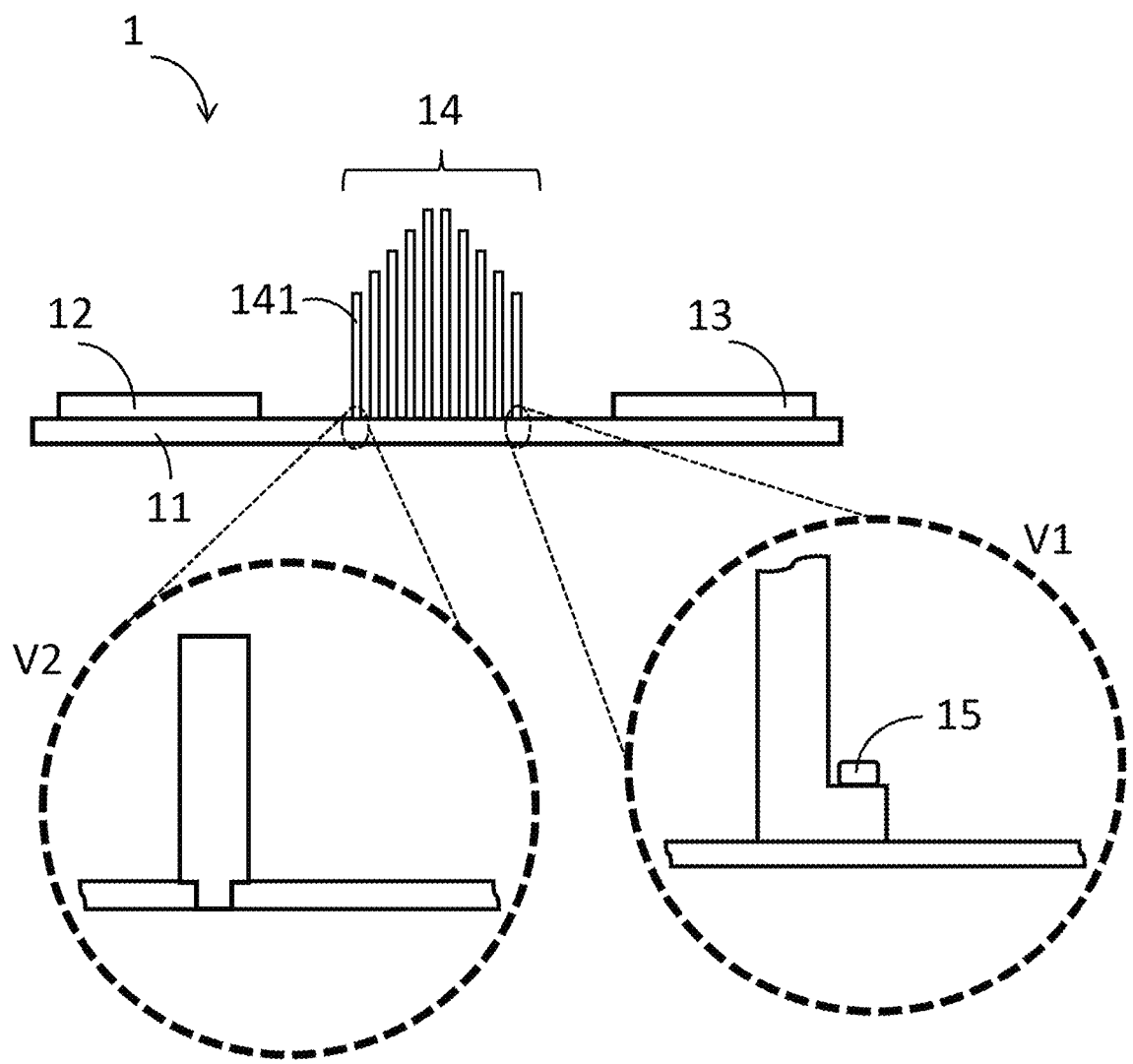
FIG. 15 is a schematic illustration of various means of connection between the metal plates and a substrate of the continuous wave radar system in accordance with one embodiment of the present disclosure.

Referring to FIG. 15, the metal plates 141 may be L-shaped to allow the metal plates 141 to be fixed to the substrate 11 by screws 15, as shown in an enlarged cross-sectional view V1. In another embodiment of the present disclosure, the metal plates 141 may also be fixed to the substrate 11 by wedging into the substrate 11, as shown in an enlarged cross-sectional view V2. In one embodiment of the present disclosure, the substrate 11 can be metallic, such that the metal plates 141 are grounded with the substrates 11 either by screws 15 or by directly wedging into the substrate 11.

Figure 16:
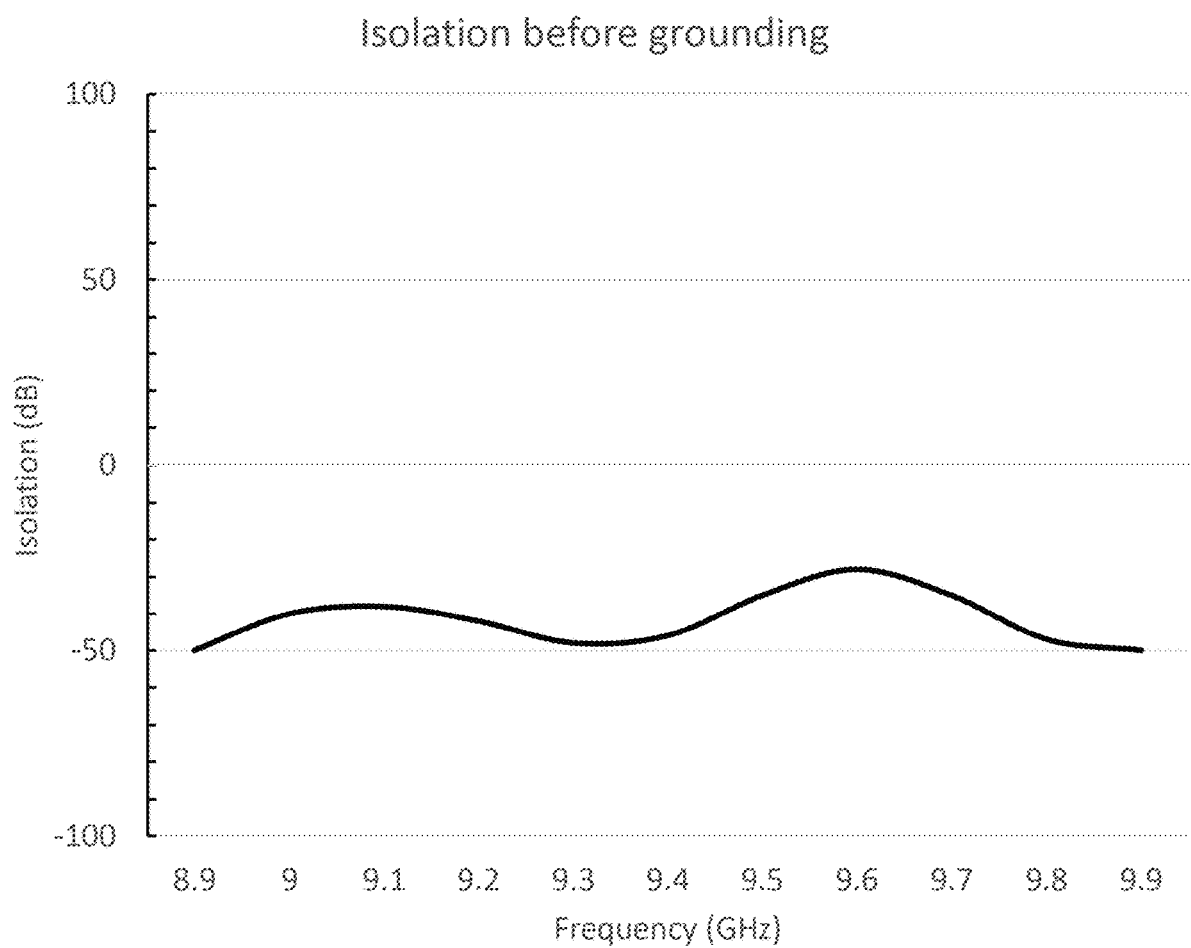
FIG. 16 is a graphical view of isolation between the transmitter and the receiver before grounding the metal plates in accordance with one embodiment of the present disclosure.
Figure 17:
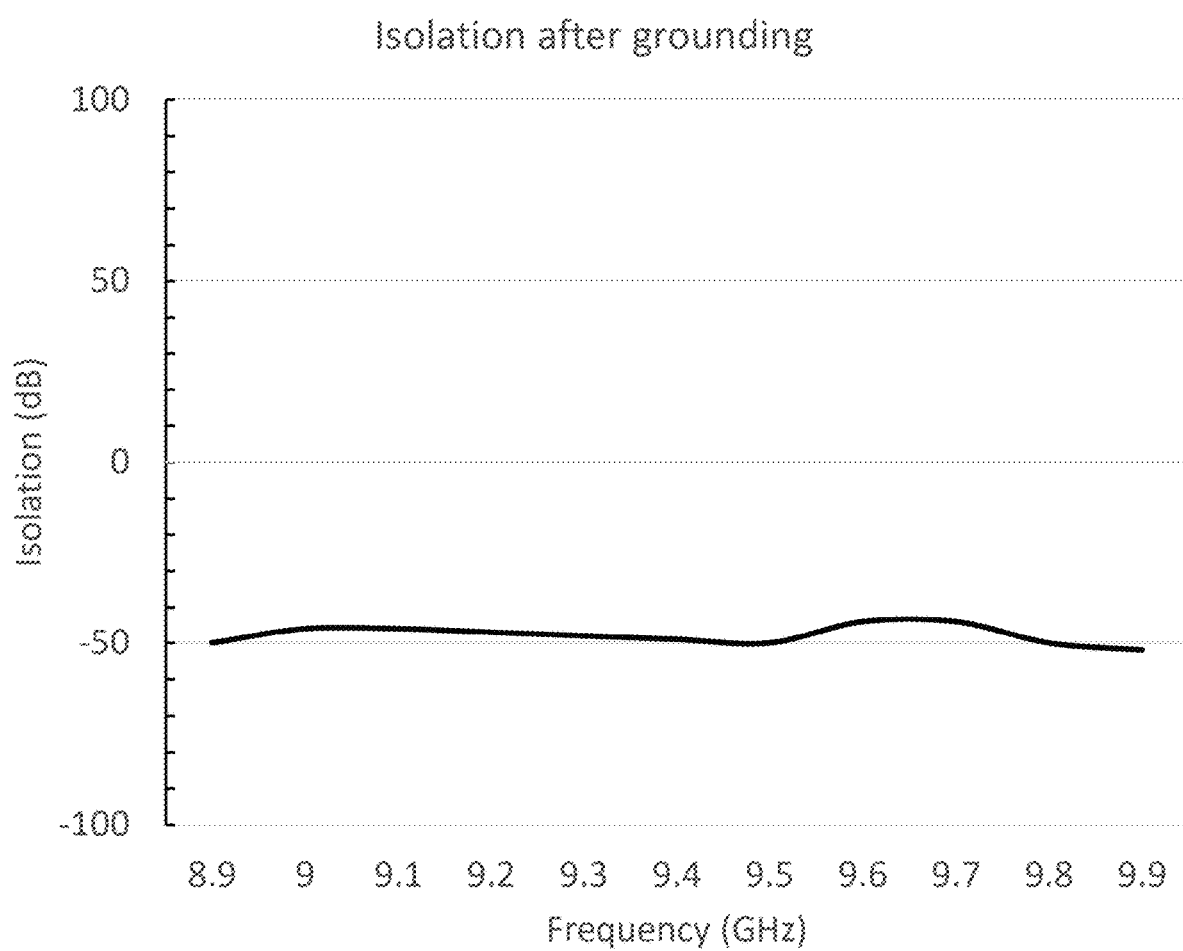
FIG. 17 is a graphical view of isolation between the transmitter and the receiver after grounding the metal plates in accordance with one embodiment of the present disclosure.

Referring to FIG. 16 and FIG. 17, the results of isolation detected between the transmitter 12 and the receiver 13 before and after grounding the metal plates 14 are shown, respectively. It could be seen that the isolation between the transmitter 12 and the receiver 13 is much lower in FIG. 16 than in FIG. 17, therefore grounding the metal plates 14 improves attenuation of the leakage signals from the transmitter 12 toward the receiver 13 significantly.

In sum, the continuous wave radar system according to the various embodiments of the present disclosure utilize the isolating device having a plurality of grounded metal plates to attenuate leakage signals transmitted from the transmitter to the receiver. Therefore, the isolating device improves the isolation between the transmitter and the receiver without significantly increasing the size, weight or circuit complexity of the continuous wave radar system.

Previous descriptions are only embodiments of the present disclosure and are not intended to limit the scope of the present disclosure. Many variations and modifications according to the claims and specification of the disclosure are still within the scope of the claimed disclosure. In addition, each of the embodiments and claims does not have to achieve all the advantages or characteristics disclosed. Moreover, the abstract and the title only serve to facilitate searching patent documents and are not intended in any way to limit the scope of the claimed disclosure.

What is claimed is:

1. A continuous wave radar system, comprising:
   a substrate;
   a transmitter disposed over the substrate;
   a receiver disposed over the substrate; and
   an isolating device comprising a plurality of metal plates parallelly disposed over the substrate between the transmitter and the receiver for attenuating leakage signal transmitted from the transmitter to the receiver,
   wherein the metal plates are grounded with the transmitter and the receiver via electrical connection between the metal plates and the substrate, and the metal plates are so arranged that an eddy current induced in each of the metal plates is directed away by grounding when leakage signal passes through the metal plates; and
   wherein the metal plates are taller than the transmitter and the receiver.

2. The continuous wave radar system according to claim 1, wherein the metal plates are evenly spaced on the substrate.

3. The continuous wave radar system according to claim 1, wherein the metal plates are perpendicular to the substrate.

4. The continuous wave radar system according to claim 1, wherein a distance between any two adjacent metal plates of the metal plates is 0.25-0.45 fold of a wavelength of a wave transmitted by the transmitter.

5. The continuous wave radar system according to claim 1, wherein a distance between the transmitter and the receiver is 3-5 folds of a wavelength of a wave transmitted by the transmitter.

6. The continuous wave radar system according to claim 1, wherein the isolating device is placed equally apart from the transmitter and the receiver.

7. The continuous wave radar system according to claim 1, wherein heights of the metal plates vary along a direction from the transmitter toward the receiver.

8. The continuous wave radar system according to claim 7, wherein top edges of the metal plates form a mountain-shape.

9. The continuous wave radar system according to claim 8, wherein the mountain-shape is symmetrical.

10. The continuous wave radar system according to claim 8, wherein the mountain-shape is asymmetrical.

11. The continuous wave radar system according to claim 8, wherein a slope of the mountain-shape is formed by a height difference between any two adjacent metal plates of the metal plates falling within a range of 0.1-0.5 fold of a wavelength of a wave transmitted by the transmitter.

12. The continuous wave radar system according to claim 1, wherein the heights of the metal plates fall within a range of 3-6 folds of a wavelength of a wave transmitted by the transmitter.

13. The continuous wave radar system according to claim 1, wherein edges of the metal plates are round.

14. The continuous wave radar system according to claim 1, wherein a thickness of the metal plates falls within a range of 1-5 mm.

15. The continuous wave radar system according to claim 1, wherein the metal plates are made of aluminum.

16. The continuous wave radar system according to claim 1, wherein the isolating device further comprises a wave absorbing material disposed between the metal plates.

17. The continuous wave radar system according to claim 1, wherein the isolating device further comprises a wave absorbing material coated on the metal plates.

18. The continuous wave radar system according to claim 1, wherein at least one of the transmitter and the receiver comprises a directional antenna.

19. The continuous wave radar system according to claim 1, wherein the metal plates are fixed to the substrate by screws.

* * * * *